UNITED STATES PATENT OFFICE.

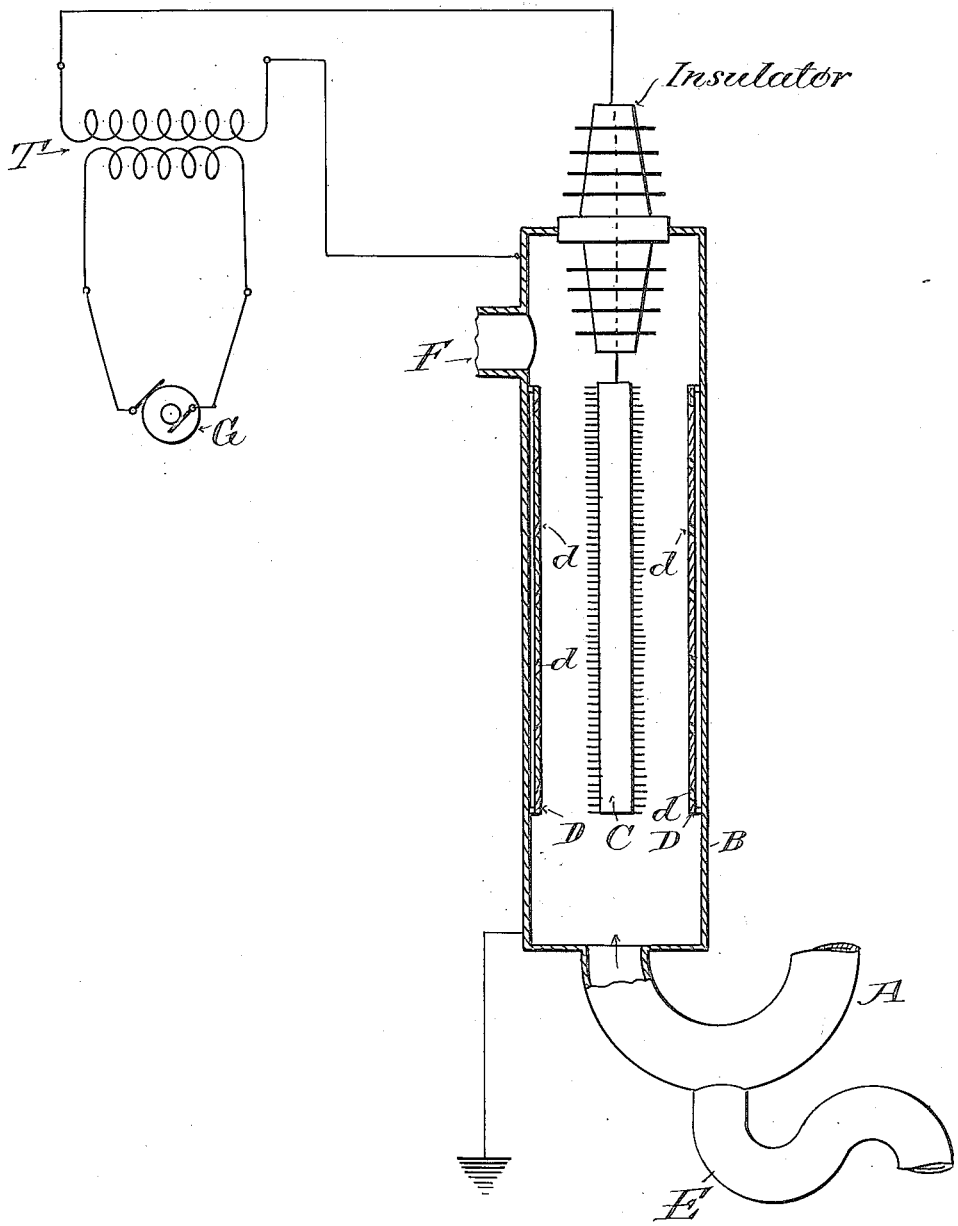

FRANK W. STEERE, OF DETROIT, MICHIGAN, ASSIGNOR TO SEMET-SOLVAY COMPANY, OF SOLVAY, NEW YORK, A CORPORATION OF PENNSYLVANIA.

ART OF REMOVING TARRY SUBSTANCES FROM GAS.

1,130,212.                    Specification of Letters Patent.    Patented Mar. 2, 1915.

Application filed January 7, 1914. Serial No. 810,905.

*To all whom it may concern:*

Be it known that I, FRANK W. STEERE, a citizen of the United States, residing at Detroit, in the county of Wayne and State of Michigan, have invented certain new and useful Improvements in the Art of Removing Tarry Substances from Gas, of which the following is a specification.

While my invention may be applied generally to the separation from a gas of any material carried in suspension therein and of such a nature that minute particles thereof may be caused to aggregate into larger particles, or globules, it is more particularly intended to be applied to the removal from the gas resulting from the destructive distillation of coal, as in the operation of retort coke ovens, or other similar gases, of the tar which in the form of minute particles or tar-mist, is set free or formed with the gas and carried along therewith. Heretofore, it has been proposed generally to remove from gas pulverulent matter in suspension therein by passing the gas past electrodes connected with a source of current whereby the gas and the contained matter is subject to the action of electric discharges taking place between such electrodes.

While it has been known in the past that when electric discharges of alternating polarity, as powerful Hertzian waves, are sent out into still, foggy air, an aggregation or coalescence of the particles of moisture tends to be effected, no useful practical application of this fact has been made, and it has been supposed, and all practical work in this line has been based on the theory, that in order to obtain any efficient deposition of matter carried in a moving stream of gas passing between opposed electrodes, a direct or rectified current must be employed, since otherwise the alternating ionization of the particles would cause these to play back and forth between the electrodes without coming to rest. However true this may be as to the dry, dust-like contents of such gases as flue or chimney gas, I have found by a long series of experiments on a commercial scale, and my invention is based upon the fact, that, where a gas, such as retort coke oven gas, or producer gas, carrying a substance such as tar, capable of forming a liquid, or semi-liquid, mass of adhesive materials, is caused to pass through an electric field of alternating polarity between opposed electrodes, one of which is provided with a smooth surface and the other is adapted to give off a brush or silent discharge, an efficient separation of the tar from the gas by its deposition upon the smooth electrode is effected with the gas stream moving at such a speed as is necessary for commercial operation. This I believe to be due to the fact that the extremely fine particles of the tar-mist in the gas are first caused to join together to form larger particles or drops having such a degree of adhesiveness as to cause the particles which have once come into contact with the smooth electrode to cling thereto and form into a mass in spite of the repulsive force.

The invention will be best understood by reference to the accompanying drawing, which is a diagrammatic representation of a form of apparatus which may be employed in carrying my invention into effect.

Referring to the drawing, A indicates a gas way leading from a source of gas (not shown), through which the gas to be treated passes to a chamber, B, preferably constructed of metal and cylindrical in shape. Centrally located within the chamber, B, and depending from suitable supports is a discharging electrode, C, the surface of which is provided with fine points adapted to give a brush discharge under suitable current conditions. Any usual or suitable material may be employed for the electrode, though I prefer an electrode having a surface and discharging points of coke as described in an application for Letters Patent filed by me June 10, 1914, Serial No. 804,226. Within the chamber, B, and electrically connected to the wall thereof is a cylindrical receiving electrode, D, formed of metal and having a smooth surface all parts of which are approximately equally distant from the discharging surface of the electrode, C.

If desired the interior surface of the wall of the chamber, B, itself may be utilized as the receiving electrode. I prefer, however, for reasons hereinafter stated, to employ a receiving electrode somewhat separated from the wall of the chamber.

The electrode, C, is connected to one of the terminals of the secondary coil of a step-up transformer, T, the other terminal of which is connected to the wall of the chamber, B, which is grounded. The primary coil of the transformer, T, receives current from an alternating current generator, G.

The coils of the transformer, T, are so proportioned and a current of such potential is delivered from the generator, G, that a high difference of potential exists between the electrodes and a brush discharge is produced from the points of the electrode, C.

In the construction and operation of the apparatus, some regard must be had to the size of the electrodes and the velocity of the gas stream, or in other words, to the time occupied by the gas in passing the electrodes, since it is possible to cause the gas to pass so quickly that the tar will not be deposited to a material extent on the electrode, D, but will be carried on with the gas out of the chamber, B. In general terms the longer the electrodes, C, D, the greater may be the velocity of the gas stream and vice versa. In practice with electrodes four and one-half feet in length and separated three and one-half inches with a current potential in the secondary coil of the transformer of approximately forty-five thousand volts, I have caused the gas to pass with a velocity of approximately one hundred feet per minute with satisfactory results. In any given case it is only necessary to note that the gas is not passing at such a speed as to carry the tar with it through the electrical field and out of the chamber, B.

As the gas enters the electrical field between the electrodes, C, D, the fine particles of tar are caused to coalesce through the electrical action and are carried over to the electrode, D, and adhere thereto, to such an extent that the electrode is quickly covered with an adhesive coating of the tar by which the particles subsequently driven over to the electrode are held. Preferably the electrode, D, is provided with slots, d, through which the accumulated tar, flowing down the electrode, passes and flows down on the outer surface of the electrode, thus preventing accumulations of the downflowing tar on the inner, lower surface of the electrode with consequent loss of uniformity in the distribution of the charge on electrode, C. The accumulated tar collects in the bottom of chamber, B, and is drawn off through pipe, E, while the purified gas escapes from the top of the chamber through pipe, F.

By this process the tar content of the gas is quickly and efficiently removed without subjecting the gas to the various successive washings heretofore required, with consequent economy of operation and without the use of complicated and expensive apparatus. The advantage of employing an alternating current for the purpose will be readily understood by those skilled in the art since it enables the ready attainment of a high difference of potential without the loss of efficiency due to rectification.

What I claim as new and desire to secure by Letters Patent is:

1. The improvement in the art of removing tar and similar particles from gas which consists in passing the gas through an electrical field of alternating polarity between a receiving and a discharging electrode, whereby the particles are caused to be deposited upon the receiving electrode.

2. The improvement in the art of removing tar and similar particles from gas which consists in passing the gas through an electrical field of alternating polarity and subjecting it in its passage to brush discharges of electricity.

3. The improvement in the art of removing tar and similar particles from gas which consists in causing a high difference of potential between opposed electrodes by delivering thereto an alternating electric current and thereby producing brush electric discharges from one of said electrodes and subjecting the gas and the particles contained therein to the action of said discharges while passing between said electrodes.

4. The improvement in the art of removing tar and similar particles from gas which consists in causing the particles to coalesce by passing the gas through an electric field of alternating polarity between a discharging electrode having a pointed surface and a receiving electrode and by brush discharges from said discharging electrode causing the aggregated particles to travel to and deposit on the receiving electrode.

In testimony whereof, I have hereunto subscribed my name, this 31st day of December A. D., 1913.

FRANK W. STEERE.

Witnesses:
HARVEY L. CORWIN,
WARREN S. BLAUVELT.